T. S. MOFFETT, G. F. BAKER & A. ROBESON.
NON-SLIPPING RUBBER TREAD HORSESHOE.
APPLICATION FILED DEC. 14, 1909.
965,594.
Patented July 26, 1910.
2 SHEETS—SHEET 1.
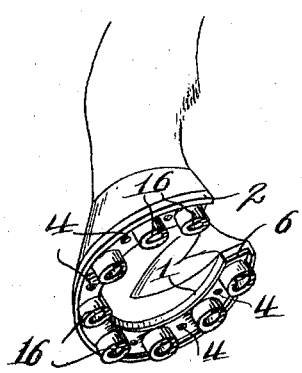
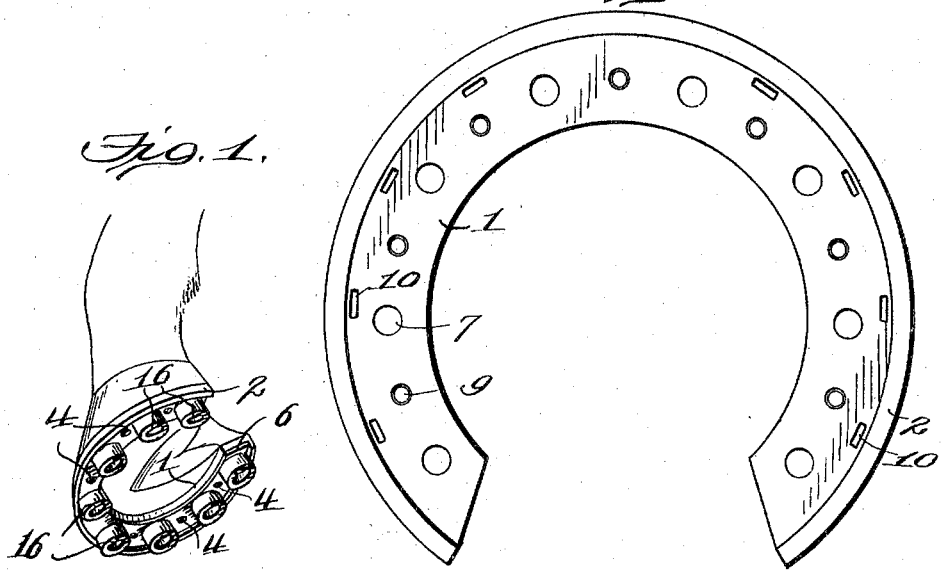
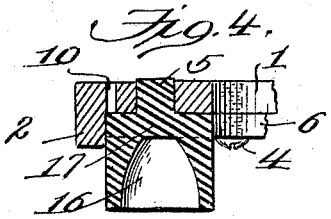
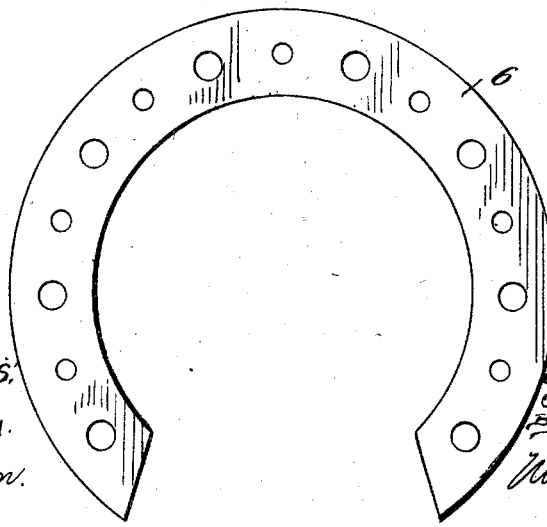
Witnesses:
A. R. Walton.
F. A. Barron.
Inventors
Thomas S. Moffett
Gilbert F. Baker
Arthur Robeson
By
Attys T. S. MOFFETT, G. F. BAKER & A. ROBESON.
NON-SLIPPING RUBBER TREAD HORSESHOE.
APPLICATION FILED DEC. 14, 1909.
965,594.
Patented July 26, 1910.
2 SHEETS—SHEET 2.
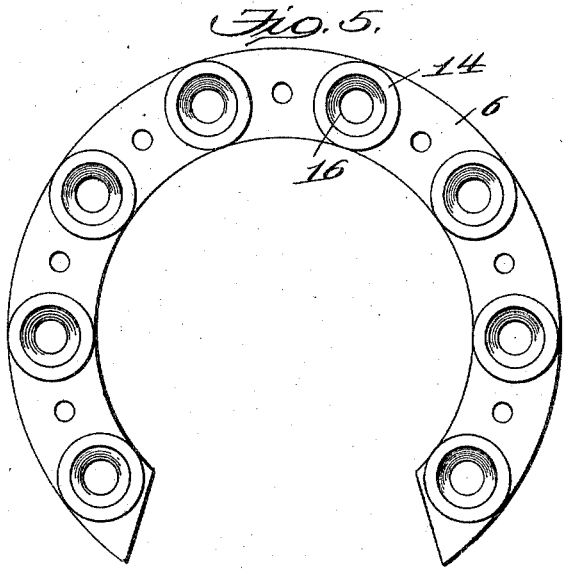
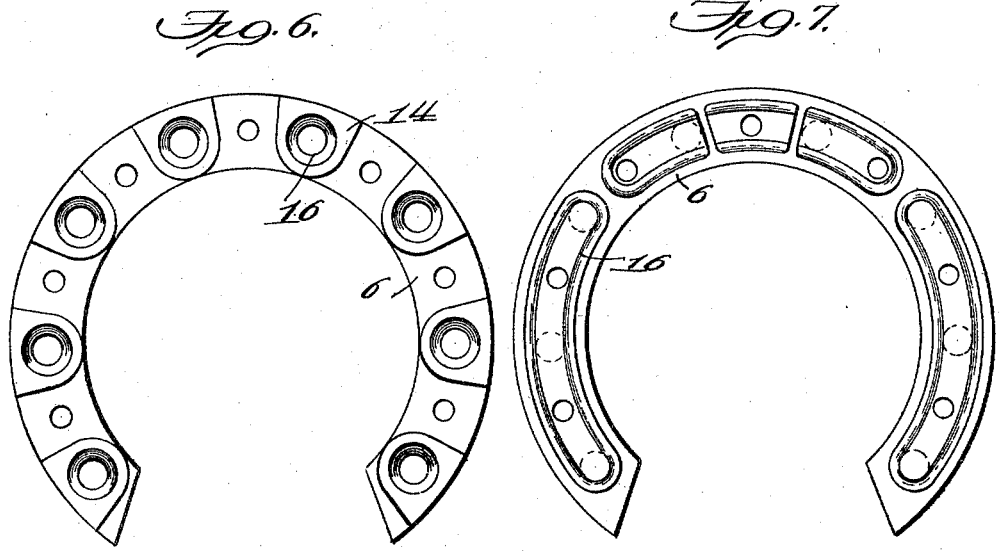

UNITED STATES PATENT OFFICE.

THOMAS S. MOFFETT, GILBERT F. BAKER, AND ARTHUR ROBESON, OF SPOKANE, WASHINGTON; SAID MOFFETT ASSIGNOR TO SAID BAKER AND ROBESON.

NON-SLIPPING RUBBER-TREAD HORSESHOE.

965,594. Specification of Letters Patent. Patented July 26, 1910.

Application filed December 14, 1909. Serial No. 533,077.

*To all whom it may concern:*

Be it known that we, THOMAS S. MOFFETT, GILBERT F. BAKER, and ARTHUR ROBESON, citizens of the United States, residing at Spokane, in the county of Spokane and State of Washington, have invented certain new and useful Improvements in Non-Slipping Rubber-Tread Horseshoes, of which the following is a specification.

Our invention relates to horse shoes of that class embodying rubber treads, and our object is to provide a horse shoe having a detachable rubber tread so constructed as to obviate all danger of slipping.

In the accompanying drawings, which illustrate our invention, Figure 1 is a perspective view showing our improved shoe complete. Fig. 2 is an outer face view of the hoof plate. Fig. 3 is an inner face view of one of the rubber treads. Fig. 4 is a central longitudinal sectional view through the complete shoe. Fig. 5 is an outer face view of a rubber tread, and, Figs. 6 and 7 are outer face views of slightly modified treads.

By reference to these drawings, it will be seen that we provide a metallic hoof plate 1, which has an angularly outstanding shallow flange 2 extending around its outer edge. Hoof plate 1 has also the rectangular nail openings 10, and a series of central equi-distantly spaced openings 7, extending longitudinally thereof, and is further provided, between each of said openings 7, with a threaded opening 9.

The rubber treads 6 are held upon the outer surface of the hoof plate 1, and confined within flange 2, by screws 4 extending through the tread and screwed into the openings 9. Each of the treads 6 have cupped outer tread surfaces adapted to suctionally grip a surface against which they are pressed and thus prevent slipping.

In the form shown in Fig. 5, the tread 6 has outer circular projections 14 provided with central cups 16, this form being used with light or fancy driving horses, saddle horses or the like upon paved streets or ice. In the form shown in Fig. 6, the outer projections 14 have cups 16 of the same size as the form, Fig. 5, although the projections themselves are enlarged thus strengthening and adapting this tread for use with medium weight horses such as are used for light draft work. In the form shown in Fig. 7, however, outer projections are dispensed with and instead the tread 6 is thickened and longitudinally elongated cups 16 formed directly in its outer surface, to adapt it to heavy draft horses. Each of these forms of treads is, however, formed, as shown in Fig. 3, with inner projections 5 which are solid (Fig. 4) and alined with, and corresponding in diameter to, the bases 17 of the cups 16 of the treads shown in Figs. 5 and 6. As shown in dotted lines in Fig. 7, several inner projections occur in the length of one of the cups 16 of this form. These inner projections 5 are of sufficient length to project through the openings 7 of the hoof plate 1 and to project slightly beyond the inner surface thereof, whereby when the animal places his foot upon the ground, not only will a partial vacuum be created in the cups 16 by compression of the tread and outer projections, but projections 5 will be forced outwardly, thus forcing outwardly the bases 17 of cups 16 and expelling additional air therefrom, to strengthen the vacuum and create greater suctional gripping force.

Thus, from the foregoing it will be seen that we provide a noiseless, non-slipping shoe which will greatly reduce injuries to animals from pounding on hard-surfaced streets, and wherein the tread may be readily and quickly renewed from time to time.

We claim:

1. The combination of an inner hoof-plate, an outer rubber tread having a cupped outer gripping surface, and means to detachably secure said tread upon said hoof-plate, said hoof-plate having openings, and said tread having inner projections alined with its outer cups and extending through said openings and beyond the inner surface of said hoof-plate.

2. The combination of a metallic hoof-plate having nail holes, and a longitudinal series of openings, certain of which are threaded, a rubber tread provided with gripping cups in its outer tread surface and with inner projections alined with said cups and extending through, and beyond the inner ends of, the unthreaded hoof-plate openings, and screws extending through said tread and into the threaded hoof-plate openings.

In testimony whereof we affix our signatures in presence of two witnesses.

THOMAS S. MOFFETT.
GILBERT F. BAKER.
ARTHUR ROBESON.

Witnesses:
JAMES B. BURCHETT,
ROGER A. JONES.